(12) United States Patent
Nalukurthy et al.

(10) Patent No.: US 11,626,008 B2
(45) Date of Patent: *Apr. 11, 2023

(54) SYSTEM AND METHOD PROVIDING EARLY PREDICTION AND FORECASTING OF FALSE ALARMS BY APPLYING STATISTICAL INFERENCE MODELS

(71) Applicant: Honeywell International Inc., Morris Plains, NJ (US)

(72) Inventors: RajeshBabu Nalukurthy, Bangalore (IN); Aatish Sethi, Bangalore (IN); Kanaka Nagendra Prasad Naraharisetti, Bangalore (IN); Kiran Reddy Singam, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 600 days.

This patent is subject to a terminal disclaimer.

(21) Appl. No.: 16/722,950

(22) Filed: Dec. 20, 2019

(65) Prior Publication Data

US 2020/0135009 A1    Apr. 30, 2020

Related U.S. Application Data

(63) Continuation of application No. 14/842,278, filed on Sep. 1, 2015, now Pat. No. 10,522,031.

(51) Int. Cl.
*G08B 29/18* (2006.01)
*G06N 7/00* (2006.01)
(Continued)

(52) U.S. Cl.
CPC .......... *G08B 29/186* (2013.01); *G06N 7/005* (2013.01); *G08B 13/19682* (2013.01);
(Continued)

(58) Field of Classification Search
CPC .... G08B 29/186; G08B 17/10; G08B 25/009; G08B 25/08; G08B 29/185; G08B 31/00; G08B 13/19682; G06N 7/005
See application file for complete search history.

(56) References Cited

U.S. PATENT DOCUMENTS 5,710,723 A    1/1998  Hoth et al.
5,786,756 A    7/1998  Piller
(Continued)

OTHER PUBLICATIONS

First Examination Report for related Indian Application No. 201614028643, dated Jan. 7, 2021 (7 pgs).
(Continued)

*Primary Examiner* — John A Tweel, Jr.
(74) *Attorney, Agent, or Firm* — Brooks, Cameron & Huebsch, PLLC

(57) ABSTRACT

A diagnostics and prediction system including a cloud system that continuously collects operating parameters from each of a number of environmental sensors and provides access to this data by a plurality of processing applications including (1) a predictive modeling system including (a) a health prediction system, (b) a sensor false alarm prediction system, (c) a zone false alarm prediction system and (d) a reporting system, (2) a system that diagnoses and predicts environmental hazardous areas and clusters areas based upon concentrations of CO in the site or building; and (3) a battery prediction system that predicts a battery life for the sensor.

20 Claims, 4 Drawing Sheets

(51) Int. Cl.
| | |
|---|---|
| *G08B 31/00* | (2006.01) |
| *G08B 25/00* | (2006.01) |
| *G08B 13/196* | (2006.01) |
| *G08B 21/16* | (2006.01) |
| *G08B 25/08* | (2006.01) |
| *G08B 25/14* | (2006.01) |
| *G08B 17/10* | (2006.01) |
| *G08B 26/00* | (2006.01) |

(52) U.S. Cl.
CPC ............ *G08B 17/10* (2013.01); *G08B 21/16* (2013.01); *G08B 25/008* (2013.01); *G08B 25/009* (2013.01); *G08B 25/08* (2013.01); *G08B 25/14* (2013.01); *G08B 26/008* (2013.01); *G08B 29/185* (2013.01); *G08B 31/00* (2013.01)

(56) References Cited

U.S. PATENT DOCUMENTS

| | | | |
|---|---|---|---|
| 6,665,004 | B1 | 12/2003 | Paff |
| 7,103,509 | B2 | 9/2006 | Shah et al. |
| 7,142,105 | B2 * | 11/2006 | Chen .................... G08B 29/183 340/521 |
| 8,290,559 | B2 * | 10/2012 | Shariati ................. A61B 5/742 600/347 |
| 9,098,553 | B2 * | 8/2015 | McConky ......... G06F 16/24578 |
| 9,852,599 | B1 * | 12/2017 | Slavin ..................... A61B 7/04 |
| 10,362,975 | B2 * | 7/2019 | Ma ........................ G01N 33/66 |
| 10,431,073 | B2 * | 10/2019 | Simon ................. G08B 29/188 |
| 10,522,031 | B2 * | 12/2019 | Nalukurthy ............ G06N 7/005 |
| 2003/0065409 | A1 | 4/2003 | Raeth et al. |
| 2014/0266669 | A1 | 9/2014 | Fadell et al. |
| 2015/0015401 | A1 | 1/2015 | Wedig et al. |
| 2015/0022339 | A1 | 1/2015 | Matsouka et al. |
| 2015/0213703 | A1 | 7/2015 | Filson et al. |
| 2019/0098039 | A1 * | 3/2019 | Gates ................... G06N 3/0427 |
| 2020/0218801 | A1 * | 7/2020 | Gross .................... G06N 20/10 |

OTHER PUBLICATIONS

European Summons to Attend Oral Proceedings Pursuant to Rule 115(1) EPC Communication for related EP Application No. 16185790.9, dated Jan. 31, 2022 (10 pgs).

Qin, S. Joe, Hongyu Yue, and Ricardo Dunia. "Self-validating inferential sensors with application to air emission monitoring." Industrial & engineering chemistry research 36.5 (1997): 1675-1685. (Year: 1997).

First Office Action from related China Patent Application No. 201610922806.5, dated Jul. 16, 2019, 20 pages.

Le et al., Predictive Maintenance Decision Using Statistical Linear Regression and Kernel Methods, Emerging Tech. and Factory Automation at pp. 1-6 (Sep. 2014) (Year: 2014).

Greitzer et al., Gas Turbine Engine Health Monitoring and Prognostics, SOLE Symp. (1999) atpp. 1-7 (Year: 1999).

Extended European search report for corresponding EP patent application 16185790.9, dated Feb. 3, 2017.

* cited by examiner

SYSTEM AND METHOD PROVIDING EARLY PREDICTION AND FORECASTING OF FALSE ALARMS BY APPLYING STATISTICAL INFERENCE MODELS

PRIORITY INFORMATION

This application is a continuation of U.S. application Ser. No. 14/842,278, filed Sep. 1, 2015, the contents of which are incorporated herein by reference.

FIELD

This application relates to security systems and more particular to the monitoring and early prediction, forecasting of probabilistic event occurrences in security systems.

BACKGROUND

Systems are known to protect people and assets within secured areas. Such systems are typically based upon the use of one more sensors that detect threats within the areas.

Threats to people and assets may originate from any of number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within the area. Intruders have also been known to injure or kill people living within the area.

In the case of intruders, sensors may be used along a periphery and used while people are home. Other sensors may be placed within the interior and used when people are not home.

In most cases, threat detectors are connected to a local control panel. In the event of a threat detected via one of the sensors, the control panel may sound a local audible alarm. The control panel may also send a signal to a central monitoring station.

While conventional security systems work well, they may degrade and fail after some period of time. This can present an additional threat to a home or building owner and the occupants of the building. Accordingly, a need exists for better methods and apparatus for monitoring for such situations.

DETAILED DESCRIPTION

Figure 1:
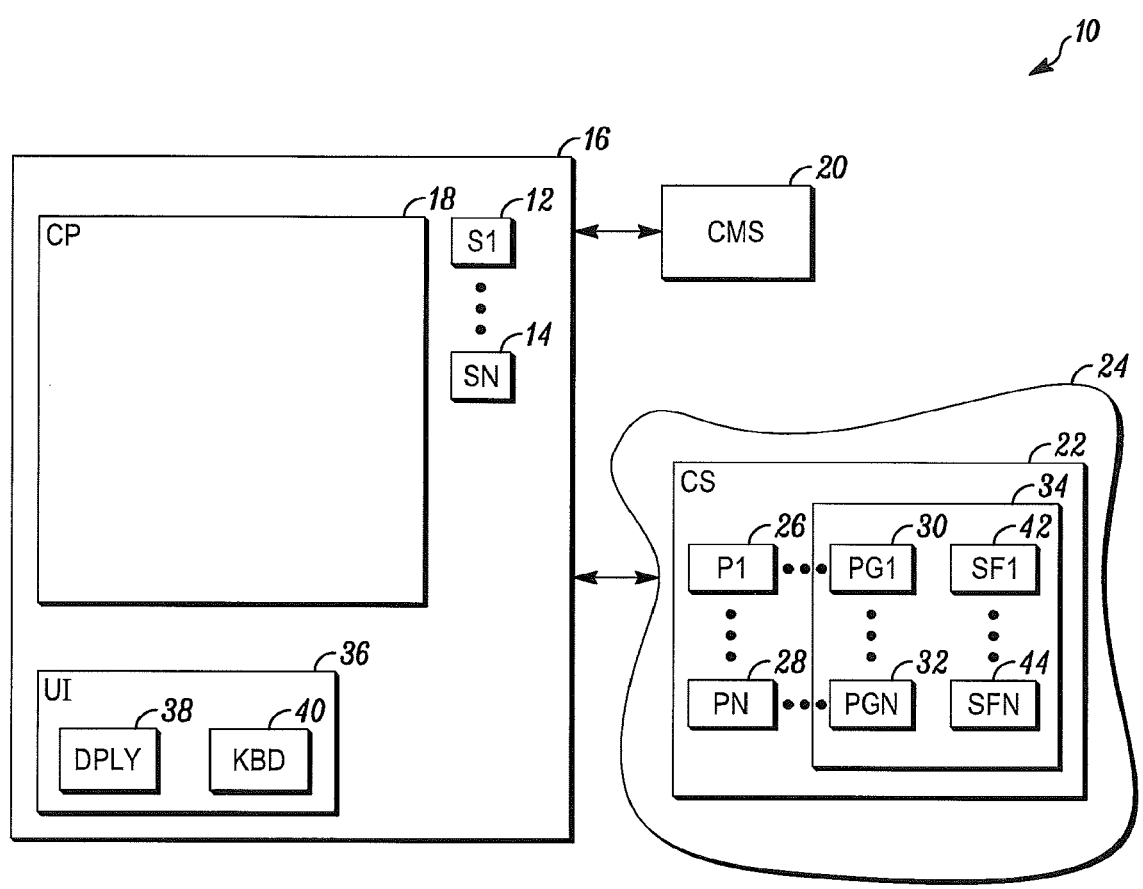
FIG. 1 illustrates a block diagram of a security system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a block diagram of a security system 10 shown generally in accordance with an illustrated embodiment. Included within the system is a number of sensors 12, 14 that detect threats within a secured geography area 16.

The sensors may detect any of a number of different types of threats. For example, at least some of the sensors may be environmental sensors (e.g., smoke, fire, carbon monoxide, etc.).

Other of the sensors may be intrusion sensors. For example, some of the sensors may be switches placed on the doors and windows providing entrance into and egress from the secured area. Others of the sensors may be passive infrared (PIR) sensors placed within an interior of the secured area to detect intruders who have been able to avoid sensors placed along a periphery of the secured area. Still other sensors may be closed circuit television (CCTV) cameras with the capability of detecting the motion of intruders.

The sensors may be monitored by a control panel 18. The control panel may be located within the secured area (as shown in FIG. 1) or located remotely.

Upon detection of activation by the control panel of one of the sensors, the control panel may send an alarm message to a central monitoring station 20. The central monitoring station may respond by summoning the appropriate help (e.g., police department, ambulance, fire department, etc.).

The security system may be controlled via a user interface 36. In this regard, an authorized human user may enter a personal identification (PIN) number and function key (or simply a function key) to arm the security system. Similarly, the user may enter a PIN and disarm key to disarm the security system.

Also included within the security system is a cloud app and monitoring system 22. The cloud monitoring system operates to monitor a status of each of the sensors within the security system via the Internet 24.

Located within the cloud system, the control panel and each of the sensors may be control circuitry that provides the functionality described herein. The control circuitry may include a number of processor apparatus (processors) 26, 28, each operating under control of one or more computer programs 30, 32 loaded from a non-transitory computer readable medium (memory) 34. As used herein reference to a step performed by a computer program is also reference to the processor that executed that step.

For example, a status processor may monitor the user interface for control instructions. Upon receiving an arm away instruction, the status processor assumes an armed state. Upon receiving a disarm instruction, the status processor assumes a disarmed state.

Similarly, an alarm processor responds to the status processor entering the armed state by monitoring the sensors. Upon detecting activation of one of the sensors, the alarm processor may compose an alarm message for transmission to the central monitoring station. The alarm message may include an identifier of the security system (e.g., an account number, an address, etc.), an identifier of any activated sensors, an identifier of the type of sensor, or a location of the sensor within the secured area and a time.

Also operating within the security system are one or more reporting processor(s) that periodically (e.g., once every minute, once every hour, once a day, etc.) reports status information from the sensors to the cloud system. The reporting processor(s) may be located within each of the sensors and/or the control panel and may report any of a number of different factors associated with the sensor. For example, the reporting processor may send a report to the cloud system each time a sensor is activated. In addition, the reporting processor may internally monitor and report on maintenance activity performed on the sensor by detecting removal of a cover that protects the sensor. The reporting processor may also perform a self-check of the sensor and report the results to the cloud app.

For example, in the case of a smoke sensor, the reporting application may measure an instantaneous value from a detector element within the smoke sensor and send the value to the cloud app. A number of associated values may also be reported to the cloud app. Associated values may include a threshold value used by the sensor to detect or not detect smoke. Another value may be a value provided by the detector element when it was first installed and periodically thereafter. Other associated values may include a date of installation or last maintenance date if such values are saved in internal memory.

A similar set of status, detector element and associated values may be reported for carbon monoxide and intrusion sensors. In the case of a PIR detector, the detector element values may be the individual outputs of a pair of infrared (IR) detectors.

In addition to status, detector element and associated values, the reporting processor also reports an identifier of the sensor and of the security system within which the sensor operates. A geographic location of each sensor may also be reported in order to identify a zone within which the sensor is located.

Within the cloud app, the status detector element and associated values are each stored within a respective file 42, 44 of the sensor in a cloud database. The files, in turn, are retrieved and used by a number of respective applications to predict false alarms, failures and other unanticipated events. For example, one of the respective applications may include a health prediction system that uses parameters collected from each system to predict the health of the system. The health prediction system may compare the collected values from each detection element with one or more threshold values to classify the sensor as either good or bad (i.e., operative or inoperative). Alternatively, the health prediction system may use values from a self-check processor to determine the operability of the sensor. Once the operability of each sensor is determined, the health prediction system may generate a report on the overall health of the system and send the report to one or more human users of the system. The report may include a list of the numbers of each type of sensor, the number of good sensors of each type and the number of bad sensors for each type. The report may also include the number of good (i.e., effectively working) sensors and bad (i.e., effectively not working) sensors per geographic area within the secured area.

Another of the applications may be a sensor false alarm prediction system. This system may retrieve the most recently measured detector element values and compare them with previously measured values. In this case, a processor of the system may compare the most recently measured value with prior values to detect spontaneous changes and to determine a rate of change of the value over time. In each case, the instantaneous value, the spontaneous changes and changes over time are used to determine a probability of malfunction or failure over some time period (e.g., the next day, next week, next month, etc.).

Under one illustrated embodiment, the instantaneous changes and changes over time are compared with a library of values associated with sensor performance and failure modes to determine the probability of failure for the sensor being considered. Once the predicted failure of each sensor is determined, an overall failure probability for the system is generated and sent to an authorized human user. The report may provide an overall predicted failure rate for the system and also the number of good and bad sensors per geographic area within the secured area.

Another of the applications may include a zone false alarm prediction system. In this case, a processor may use the predicted failure value to identify one or more geographic zones with the highest relative probability of failure. The processor may cluster these zones based upon the probability of failure over some time period. This information may be used to generate a two or three-dimensional floor plan (map) identifying the areas with the highest probability of failure. The floor plan is sent to authorized users.

Another of the applications may include a reporting system that reports the data to each authorized user. This system generates a graphical, probabilistic, predicted, possible false alarm report including information from the health prediction system, the sensor false alarm prediction system and the zone false alarm prediction system.

Still another of the applications may include an environmentally hazardous area detection system. This system may include a processor that retrieves CO detection levels from each sensor, the detection state of the sensor and the maintenance record of each sensor. The processor executes a program that provides a statistical inference model for each area of the site or building of the secured area and clusters areas into hazardous areas based upon concentrations of CO in the site or building. The program generates a report as above displaying the data on a two or three-dimensional map.

Another of the applications is a battery prediction system. The battery prediction system retrieves battery status for each wireless sensor. The processor may receive a time period from the user interface. In the case of a mesh network, the processor may also determine a parent child status of each sensor and the operating time of each sensor under that mode of operation. Based upon this information, the processor predicts a battery life for each sensor.

False alarms have been a major problem in the fire alarm industry. Most of the false alarms happen for a number of different reasons. Some of the alarms happen because of the external environment over which a user has no control. For example, if there is a constant and slow accumulation of dust in the chamber of a fire detector, then a threshold will be reached in X days where there would be a false alarm in the building.

On the other hand, if it is possible to let the user know that there might be a false alarm or that the device might not work as expected because of the dust accumulating in the device, it could be used to help building owners, building management system team, or other stakeholders in a number of different ways. For example, if a mechanism existed to let a user know that at least some of the devices would generate a false alarm in X days, effective maintenance operations can be performed to avoid false alarms.

Alternatively, if there is too much variation among the sensitivities of different devices in a zone, then these variations raise questions about the reliability of the system. This is the case because some devices might trigger an alarm quickly while others may take more time.

The system of FIG. 1 solves these problems in a number of different ways. First, each sensor of the fire system is connected to a monitoring system in the cloud. Second, all devices send their parameters to the cloud whenever there is a change in any of its parameters or the web portal of the security system constantly pulls the data from the devices on a specific time interval and pushes it to the cloud.

Third, the cloud provides and continuously executes a number of intelligent algorithm (programs) to track and predict any change in the sensors and uses its intelligence, data mining and statistical analytical capabilities to predict the probability of a false alarm occurring. When the environment of the sensors remains constant and the rate of change in the device parameters follows a consistent pattern, the algorithm extrapolates using a linear regression analysis and provides or otherwise comes up with a probability of false alarm in X number of days. For example, assume that the dust percentage obscuration in a device is increasing at a constant interval over a time period of X days. In this case there would be a probability of a false alarm in the coming Y days. Here the probabilities will be higher as the dust accumulates. Alternatively, when there is random change in the device behavior, then a statistical non-linear regression analysis process may use a least square method to find the best fitting line of failure probability based upon Bayes prediction theory. In this case, the different parameters provide different probabilities of the device giving a false alarm in the future.

Fourth, the predicted false alarms along with their locations can be sent to any or all stake holders in a desirable format. These reports can be pulled from anywhere by any or all stake holders. Fifth, maintenance activity can be concentrated on these areas to reduce the cost/effort/time of the maintenance.

These concepts may be demonstrated using the example of a smoke alarm. For example, to determine or to predict false smoke alarms with a good probability of prediction success, a statistical inference method or procedure may be used. A statistical method may be used because parameters (predictor) values observed over a period may be non-linear (i.e., they represent a nonlinear dynamical system) and do not perfectly predict false alarms in a deterministic sense.

Linear regression is one mining methods/techniques used for predicting future values of variables. Relationships between independent variables (which can be smoke level) and dependent variables (month or day) can be described by the relationship y=a+bn, where y is a dependent variable, n is an independent variable and a and b are line coefficients.

A least square method may be employed to find the best fitted regression line (least-square regression line). For y=a+bn, the residual error, $e_i = y_i - \hat{y}_i$, where $a = \vec{y} - b\vec{n}$, and $$b = \frac{\sum_{i=1}^{n}(n_i - \hat{n})(y_i - \hat{y})}{\int_{i=1}^{n}(n_i - \hat{n})^2}.$$

Figure 2:
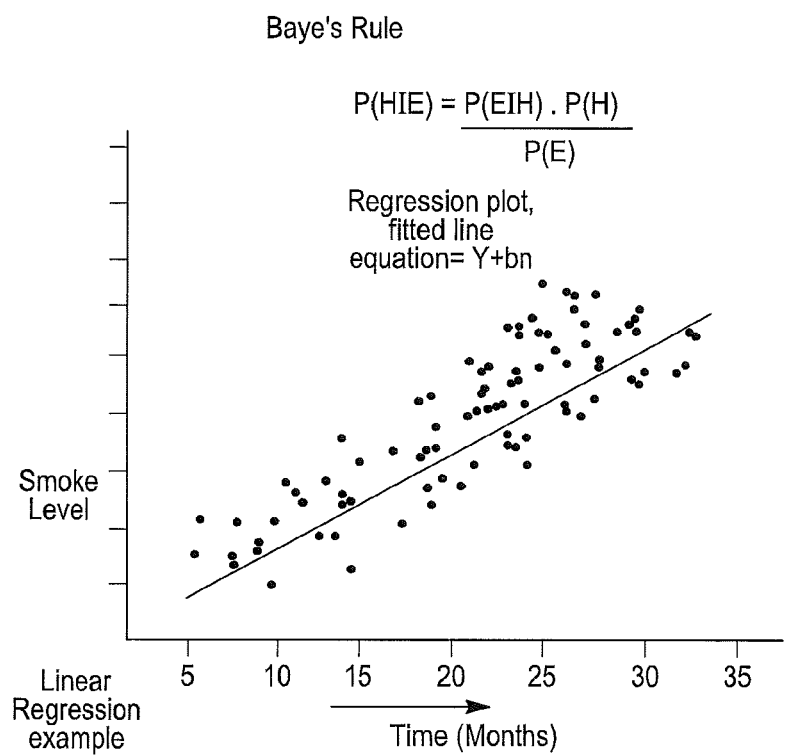
FIG. 2 illustrates a Bayesian diagram of false alarms using the processes of the system of FIG. 1.

One approach to performing linear regression is to use a Bayesian regression approach. In this case, prior information (parameters from the sensor) can be combined with other prior information (e.g., from a manufacturer) to form a distribution of false alarm probabilities for further sensor analysis as shown FIG. 2. In this case, a user can determine inferences by following the best fitted line of FIG. 2 to the proper time period. In this case, the data of FIG. 2 is used by the user to determine the likelihood of the event (false alarm) happening in at any particular time or can give the user the probability of the event occurring in a specific time period found through regression analysis.

Figure 3:
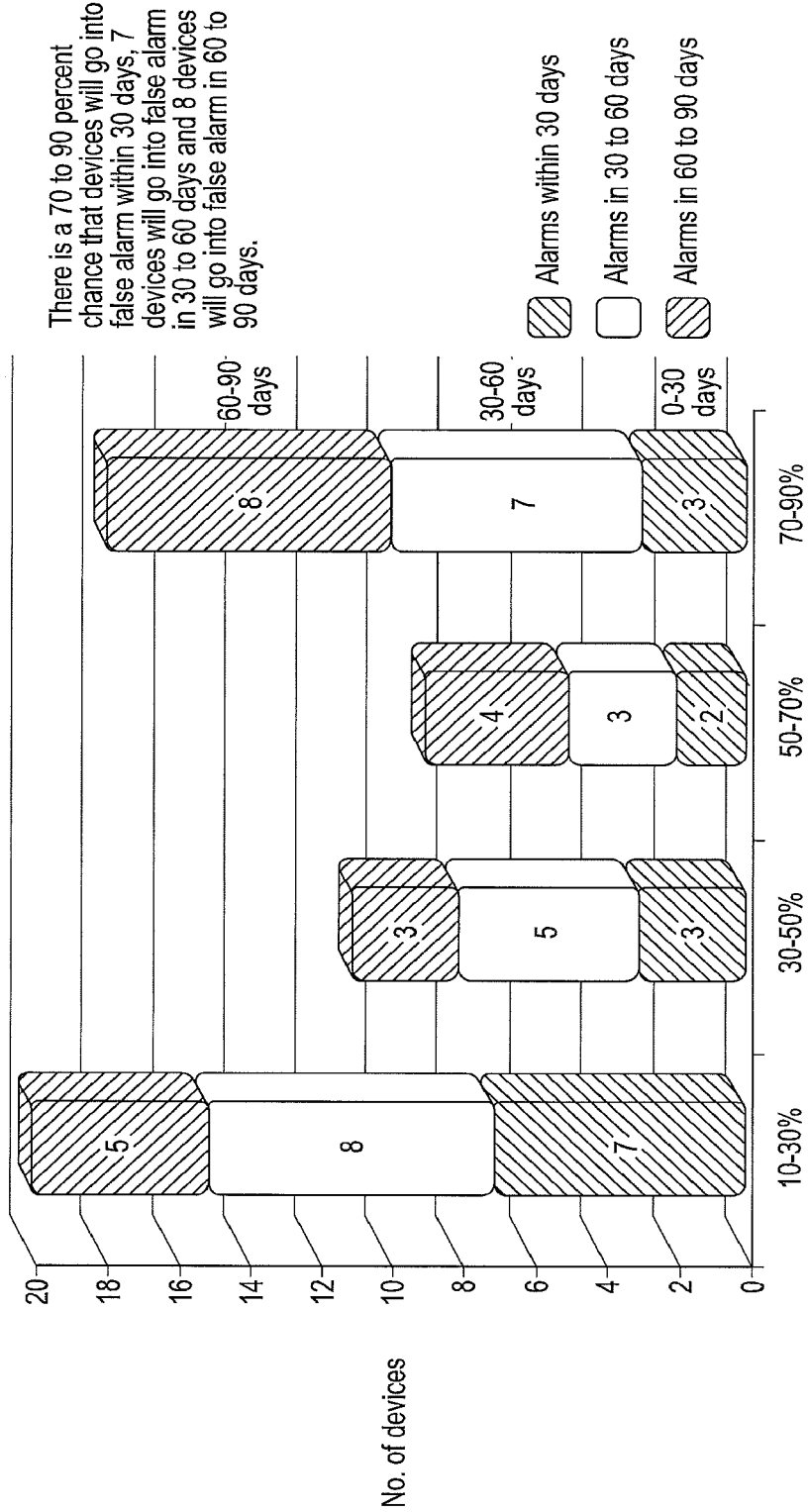
FIG. 3 depicts the probability of false alarms for a system.
Figure 4:
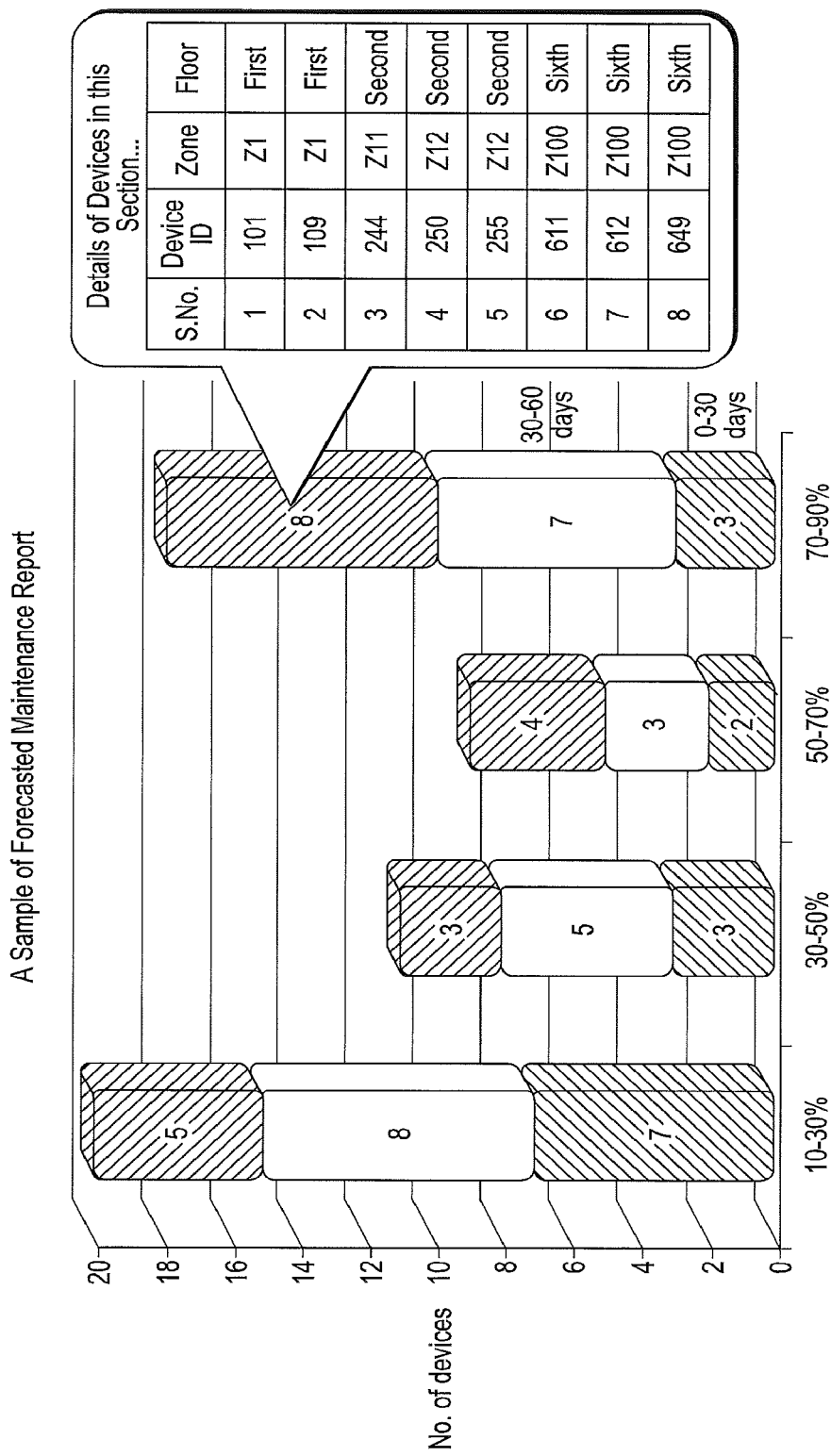
FIG. 4 depicts the probability of false alarms depicted by zone.

FIGS. 3 and 4 are examples of forecasted false alarms from a reporting processor based upon the user of regression analysis. In this case, FIG. 3 depicts an overall analysis of 20 devices. FIG. 4 further depicts an analysis by zone.

The system of FIG. 1 offers a number of advantages over prior art systems. For example, if the end user knows that his/her smoke detectors are not reliable or will not work, effective actions can be taken in advance of failure. If the end user knows that there is a high probability of one or more false alarms today, then cleaning actions can be taken to avoid or reduce false alarms without interrupting business operations. This can reduce the down time of the operation. During maintenance, the end user can concentrate on the devices which might give false alarms instead of all devices. The cost of maintenance can be reduced. The system of FIG. 1 significantly improves the reliability of the devices in operation. The system also addresses the problem of too great a variance among the sensitivities of devices in a zone where some devices may trigger alarms quickly and some will take more time.

The system of FIG. 1 also provides a method of clustering false alarm zones. The clustering allows a maintenance team to find the root cause of the cluster and repair the root cause. For example, sometimes the environment in these clusters might be causing false alarms and, so, action can be taken to control the environmental reason leading to the false alarms.

The system provides a method of clustering predicted false alarm zones, comparing variance among the sensitivities of different devices and clustering them into zones for effect maintenance. It provides a method of preparing a graphical probabilistic predicted possible false alarm report for effective maintenance operations. It provides a method of reducing the cost of maintenance operations by concentrating only on possible false alarms in zones/devices rather than all zones/devices during maintenance.

In general, the system of FIG. 1 includes a cloud system embodied as a set of steps executing on a processor, the cloud system being coupled to a security system having a plurality of sensors that detect threats within a secured area, the cloud system continuously collects operating parameters from each environmental sensor of the plurality of sensors as data, maintains a history of this data in a cloud database and provides access to this data by a plurality of processing applications, the processing applications further including (1) a predictive modeling system having (a) a health prediction system that compares values of the collected parameters of each sensor with one or more thresholds to classify the sensor into one of two categories of either good or bad and determines an overall health of the security system based upon the numbers of each, (b) a sensor false alarm prediction system that predicts false alarms in a building, the system mines device data including changes of the parameters from original values, a rate of change of parameters and spontaneous changes in the parameters and predicts a probability of false alarms based upon time period, (c) a zone false alarm prediction system that clusters zones of the security system based upon the collected data, predicts a probability of false alarms per clustered zone based upon time period and sends their location to authorized persons on a two or three dimensional floor plan and (d) a reporting system that generates a graphical, probabilistic, predicted, possible false alarm report including information from the health prediction system, the sensor false alarm prediction system and the zone false alarm prediction system and sends the generated report to a human user, (2) an environmental hazardous area system for a site or building of the secured area that mines carbon monoxide (CO) data parameters from each CO sensor of the plurality of sensors including one or more of CO concentration, CO detection state of the sensor and last maintenance date of the CO sensor over a period of time, runs a statistical inference model for each area of the site or building and clusters areas into hazardous areas based upon concentrations of CO in the site or building and (3) a battery prediction system that mines battery status for each wireless sensor of the plurality of sensors over a period of time along with a network status including at least a status of either a parent or child node in a mesh network to predict a battery life for the sensor.

Alternatively, the system of FIG. 1 includes a security system that protects a secured geographic area, a plurality of sensors that detect environmental threats within the secured area, cloud memory that saves operating parameters and activation reports from each of the plurality of sensors and a cloud processor that analyzes the operating parameters and activation reports and generates a probability report of a false alarm within X days based upon a rate of change and random changes of operating parameters and the activation reports for each of the plurality of sensors and sends the probability report to a human user of the security system.

Alternatively, the system of FIG. 1 includes a security system that protects a secured geographic area, a plurality of sensors that detect environmental threats within the secured area and a cloud system embodied as a set of steps executing on a processor, the cloud system being coupled to the security system, the cloud system collects operating parameters from each environmental sensor of the plurality of sensors as data, maintains a history of this data in a cloud database and provides access to this data by a plurality of processing applications that analyze the operating parameters and activation reports and generates a probability report of a false alarm within X days based upon a rate of change and random changes of operating parameters and the activation reports for each of the plurality of sensors and sends the probability report to a human user of the security system.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A monitoring device, comprising:
a memory; and
a processor coupled to the memory, wherein the processor is configured to execute executable instructions stored in the memory to:
collect operating parameters from a sensor that detects threats within a geographic area over a time period;
determine a rate of change of the operating parameters;
extrapolate the rate of change of the operating parameters using non-linear regression over the time period in response to the rate of change of the operating parameters being intermittent; and
determine a probability of a false alarm of the sensor based upon the time period.

2. The device of claim 1, wherein the processor is further configured to execute executable instructions stored in the memory to:
extrapolate the rate of change of the operating parameters using linear regression over the time period in response to the rate of change of the operating parameters remaining constant.

3. The device of claim 1, wherein the processor is further configured to execute executable instructions stored in the memory to:
store the operating parameters in the memory.

4. The device of claim 1, wherein the sensor is at least one of: an environmental sensor or an intrusion sensor.

5. The device of claim 4, wherein the environmental sensor is at least one of: a smoke detector, a fire detector, or a carbon monoxide detector.

6. The device of claim 4, wherein the intrusion sensor is at least one of: a switch, a passive infrared sensor, or a closed-circuit television camera.

7. A fire system, comprising:
a sensor configured to detect threats within a geographic area; and
a monitoring device, comprising:
a memory; and
a processor coupled to the memory, wherein the processor is configured to execute executable instructions stored in the memory to:
collect operating parameters from the sensor over a time period;
determine a rate of change of the operating parameters;
extrapolate the rate of change of the operating parameters using linear regression over the time period in response to the rate of change of the operating parameters remaining constant; and
determine a probability of a false alarm of the sensor based upon the time period.

8. The system of claim 7, wherein the processor is configured to execute executable instructions stored in the memory to:
extrapolate the rate of change of the operating parameters using non-linear regression over the time period in response to the rate of change of the operating parameters being intermittent.

9. The system of claim 7, wherein the processor is configured to execute executable instructions stored in the memory to:
combine information from a manufacturer with the operating parameters.

10. The system of claim 7, wherein the processor is configured to execute executable instructions stored in the memory to:
generate a probability report including the determined probability of the false alarm of the sensor based upon the time period.

11. The system of claim 10, wherein the processor is configured to execute executable instructions stored in the memory to:
send the probability report to a user.

12. The system of claim 7, wherein the sensor comprises:
a sensor memory.

13. The system of claim 12, wherein the sensor is configured to:
store at least one of: the operating parameters, an installation date, or last maintenance date of the sensor in the sensor memory.

14. The system of claim 13, wherein the sensor is configured to:
provide at least one of: the operating parameters, the installation date, or the last maintenance date of the sensor to the monitoring device.

15. The system of claim 7, wherein the processor is configured to execute executable instructions stored in the memory to:
collect operating parameters from a different sensor.

16. The system of claim 15, wherein the processor is configured to execute executable instructions stored in the memory to:
determine a probability of a false alarm of the different sensor based upon the time period.

17. The system of claim 15, wherein the processor is configured to execute executable instructions stored in the memory to:
cluster the sensor and the different sensor into a false alarm zone.

18. A method, comprising:
collecting operating parameters at a monitoring device from an environmental sensor configured to detect threats within a geographic area over a time period;
determining a rate of change of the operating parameters at the monitoring device;
extrapolating the rate of change of the operating parameters using linear regression over the time period in response to the rate of change of the operating parameters remaining constant at the monitoring device;
extrapolating the rate of change of the operating parameters using non-linear regression over the time period in response to the rate of change of the operating parameters being intermittent at the monitoring device; and
determining a probability of a false alarm of the environmental sensor based upon the time period at the monitoring device.

19. The method of claim 18, wherein extrapolating the rate of change of the operating parameters using non-linear regression includes using a least squares method.

20. The system of claim 18, wherein extrapolating the rate of change of the operating parameters using linear regression includes using Bayesian regression.

* * * * *